United States Patent [19]

Hauer et al.

[11] Patent Number: 5,626,947
[45] Date of Patent: May 6, 1997

[54] COMPOSITE CHEMICAL BARRIER FABRIC FOR PROTECTIVE GARMENTS

[75] Inventors: Ernst J. Hauer, Steinheim; Stasys K. Rudys, Luxembourg, both of Luxembourg; James P. Zeigler, Richmond, Va.

[73] Assignee: E. I. Du Pont de Nemours and Company, Wilmington, Del.

[21] Appl. No.: 533,407

[22] Filed: Sep. 25, 1995

Related U.S. Application Data

[60] Division of Ser. No. 63,389, May 17, 1993, abandoned, which is a continuation-in-part of Ser. No. 891,360, May 29, 1992, abandoned.

[51] Int. Cl.$^6$ ............................................. B32B 3/00
[52] U.S. Cl. ........................... 428/195; 428/102; 428/104
[58] Field of Search .............................. 428/195, 102, 428/104, 286

[56] References Cited

U.S. PATENT DOCUMENTS

| | | | |
|---|---|---|---|
| 3,238,056 | 3/1966 | Pall et al. | 117/98 |
| 3,442,686 | 5/1969 | Jones | 117/70 |
| 4,056,208 | 11/1977 | Prejean | 215/12 R |
| 4,152,389 | 5/1979 | Miller | 264/284 |
| 4,214,321 | 7/1980 | Nuwayser | 2/167 |
| 4,272,851 | 6/1981 | Goldstein | 2/79 |
| 4,328,652 | 5/1982 | Naumovich, Jr. | 52/408 |
| 4,442,162 | 4/1984 | Kuester | 428/245 |
| 4,588,646 | 5/1986 | Athey, Jr. | 428/457 |
| 4,772,510 | 9/1988 | McClure | 428/286 |
| 4,792,480 | 12/1988 | Freund et al. | 428/286 |
| 4,816,330 | 3/1989 | Freund et al. | 428/286 |
| 4,833,010 | 5/1989 | Langley | 428/287 |
| 4,855,178 | 8/1989 | Langley | 428/287 |
| 4,920,575 | 5/1990 | Bartasis et al. | 2/2 |
| 4,923,741 | 5/1990 | Kosmo et al. | 428/252 |
| 4,943,475 | 7/1990 | Baker et al. | 428/246 |
| 5,004,645 | 4/1991 | Tallentire et al. | 428/323 |
| 5,035,941 | 7/1991 | Blackburn | 428/286 |
| 5,059,477 | 10/1991 | Hendriksen | 428/220 |
| 5,162,148 | 11/1992 | Boyé et al. | 428/287 |

FOREIGN PATENT DOCUMENTS

| | | |
|---|---|---|
| 0202996 | 11/1986 | European Pat. Off. . |
| 0434572 | 6/1991 | European Pat. Off. . |
| 0505027 | 9/1992 | European Pat. Off. . |
| 03515025 | 10/1986 | Germany . |
| 8709592 | 5/1987 | Germany . |
| 8910537 | 9/1989 | Germany . |
| 3142231 | 6/1991 | Japan . |
| 4173137 | 6/1992 | Japan . |

OTHER PUBLICATIONS

Goydan, R. et al., "Evaluation of Polyester and Metalized-Polyethylene Films for Chemical Protective Clothing Applications", Journal of Plastic Film & Sheeting, vol. 6, pp. 106–116 (Apr. 1990).

*Primary Examiner*—Christopher Raimund

[57] ABSTRACT

Composite chemical barrier films and fabrics that are particularly useful in protective garments. The composite barrier material may be made by laminating a barrier film to a flexible substrate using a thermoplastic resin and topcoating the barrier film with a similar or dissimilar thermoplastic resin to allow fabric seaming when the fabric is fabricated into a protective garment. Protective garments made from the materials are lightweight while maintaining an adequate balance of strength and chemical protection.

10 Claims, 2 Drawing Sheets

COMPOSITE CHEMICAL BARRIER FABRIC FOR PROTECTIVE GARMENTS

This is a division of application Ser. No. 08/063,389 filed May 17, 1993, now abandoned, which is a continuation-in-part of application Ser. No. 07/891,360 filed May 29, 1992, now abandoned.

FIELD OF THE INVENTION

The present invention relates to a composite material particularly useful in making chemical protective garments. In particular, this invention relates to a composite film suitable for use in protective garments. In addition, this invention relates to a lightweight composite fabric, comprised of a flexible substrate laminated to this composite film.

BACKGROUND OF THE INVENTION

In particular situations people may encounter harmful concentrations of hazardous chemicals. In such situations, it is necessary to wear chemical protective garments of special composition and construction. These protective garments are necessary for providing an effective barrier between the wearer and the chemicals encountered. However, as pointed out in U.S. Pat. No. 4,855,178 (Langley), in addition to providing an effective chemical barrier, materials for chemical protective garments should meet practical requirements for amenability to fabrication by existing methods (e.g., heat bonding of-seams) as well as for providing sufficient strength to prevent tearing and the resulting loss of protection.

General practice in the protective garment trade is to construct chemical protective garments by seaming together panels of chemical protective garment material. These seams may be formed in a number of ways. The seams may be formed by traditional methods of sewing and then covering the seam with a layer of heat sealing tape. Alternatively, the seams may be formed by heat or ultrasonic welding of the garment material. These seams may utilize adhesives.

Suitable chemical protective garment materials must be flexible to allow manipulation during seaming on standard seaming equipment, whether it be by sewing, adhesives or heat sealing. The chemical protective garment materials must also be of a composition that allows the formation of strong sealed seams, whether these seams are sewn and taped, adhesively joined or whether they are welded by heat or ultrasonic energy.

In addition, chemical protective garments must be durable in use. The garments must not develop structural failures during use which would expose the wearer to hazardous chemicals. Thus, the chemical protective garment materials and the seams created in constructing the garments must be strong and resistant to structural failure (e.g., to tearing, cracking or shrinking).

In many situations, it is not feasible to decontaminate chemical protective garments after exposure to hazardous chemicals. A chemical protective garment contaminated with a hazardous chemical is generally considered as hazardous waste. There is limited space for the storage and burial of hazardous wastes. Chemical protective garments intended for limited-use, should be light in weight to reduce the burden on storage and disposal.

Strong, lightweight chemical protective garment materials made from laminates of different materials are known. U.S. Pat. No. 4,272,851 (Goldstein) describes a film of polyethylene that may be laminated to nonwoven chemical protective apparel. U.S. Pat. No. 4,772,510 (Mc Clure) describes a chemical barrier film laminated to a nonwoven substrate using an adhesive. Other laminates having multiple barrier layers are described in U.S. Pat. Nos. 4,855,178 (Langley); 4,833,010 (Langley) and U.S. Pat. No. 5,035,941 (Blackburn).

Often, each layer of a chemical protective garment material is chosen to impart a specific property to the composite fabric. Some layers provide strength while other layers may be chosen to provide permeation resistance against specific classes of chemicals. Additional layers add weight and stiffness. However, stiff garments are difficult to assemble and reduce the wearer's mobility.

There has been a general trend in the protective garment art to add additional layers to chemical protective garment materials to increase and broaden resistance to various classes of chemicals. This adds weight, stiffness and cost to these materials. For example, EP-0 434 572 (Boyer et al.) discloses a six (6) layered chemical protective garment material employing polyvinylidene chloride coated polyethylene terephthalate (PET) as the chemical barrier layer. The material comprises a nonwoven substrate, a layer of polyethylene, an adhesive layer, a layer of polyvinylidene chloride coated PET film, another layer of adhesive, and finally a layer of polyethylene. U.S. Pat. No. 4,920,575 (Bartasis) discloses a multi-layered structure that may contain one or two layers of a polyester film.

U.S. Pat. No. 4,214,321 (Nuwayser) describes a chemical permeation resistant, multilayer sheet material consisting of an outer abrasion resistant polymer resin, such as polyester or fluorocarbon, an intermediate layer of aluminum foil which does not allow the passage of organic solvents, and an inner heat sealable polymeric layer of polypropylene or polyethylene. What he does not describe, and which is well known among those conversant in the art, is that there must be at least one additional layer between the outer polymeric layer and the foil and at least one additional layer between the foil and inner heat sealable resin layer to adhere these layers into a single structure. Neither does Nuwayser recognize that an outer polyester layer, such as "MYLAR" polyester film, made by DuPont, provides a sufficient barrier to organic solvent permeation as was later disclosed in the "Journal of Plastic Film & Sheeting", Vol 6, page 106, April, 1990 (Goyden, et al).

Clearly, what is needed is a lightweight, chemical protective garment material, having a limited number of distinct layers, which can be assembled into a protective garment wherein the particular layers impart more than one property to the composite material. In particular, the applicants have recognized the need for a chemical protective garment material having a single barrier layer which provides protection against several classes of chemicals, which contributes to garment strength, and which provides for the construction of protective garments with strong seams. In addition, the applicants recognize a need for chemical protective garment materials that have a distinctive color. In addition, the applicants recognize the need for simplified processes to make such chemical protective garment materials.

An object of this invention is to make a new, improved chemical protective garment material from a thin film and a flexible woven or nonwoven substrate. This requires the right combination of ingredients and structure that give a composite material with the desired properties. It requires a barrier film that resists permeation to a wide variety of organic and inorganic chemicals. The permeation resistance of the barrier film must not be degraded by flexing. The barrier film should be lightweight so that it is flexible and economic to use, to dispose of after use and not increase the weight burden to user. The composite barrier material, with or without the flexible substrate should be strong in tensile properties and burst strength, and must allow the formation of strong, sealed seams and must resist tear propagation.

Another object is a composite material which does not create excessive noise or is stiff when fabricated into a garment; or the wearer can be hindered or perhaps endangered while doing his job. The layers in such materials must be strongly adhered, such that they do not separate when the material is flexed and crimped, or else the composite material looses properties dependent on the synergy of characteristics of the individual components. The composite should have adequate tear resistance to be practical when fabricated into chemical resistant clothing.

Other objects and advantages of the present invention will become apparent to those skilled in the art upon reference to the attached drawings and to the detailed description of the invention which hereinafter follows.

SUMMARY OF THE INVENTION

The present invention relates to a composite materials for use in chemical protective garments wherein the composite materials have an improved balance of chemical resistance and physical properties. In one aspect of the invention, the chemical protective garment material comprises a laminate of a barrier film and polymeric material, preferably a thermoplastic resin. Polymeric material may cover one or both faces of the barrier film. When both faces of the barrier film are coated, the polymeric film on each face may be of the same or different composition. The polymeric layers may be pigmented to readily distinguish the material from other chemical protective films.

As one embodiment of the invention, a composite, protective film consists essentially of a barrier film of less than 0.5 mils, the uncoated barrier film has a chemical barrier rating of at least 50, and the composite, protective film has a burst strength of at least 40 psi, forms a heat seal peal strength of at least 1500 g/inch and preferably, a basis weight of no greater than 37 g/m2. When the composite protective film comprises a barrier film of greater than 0.5 mils but less than 1.3 mils, the uncoated barrier film has a chemical barrier rating of at least 75 and the composite protective film has a burst strength of at least 80 psi, forms a heat seal peal strength of at least 1500 g/inch and preferably, a basis weight of no greater than 66 g/m2.

In another aspect of the invention, the chemical protective garment material comprises a flexible substrate that is laminated to a barrier film by a polymeric material, preferably a thermoplastic resin. A polymeric topcoat material covers the unlaminated face of the barrier film. The composition of the polymeric material used to topcoat the film may be of the same or different composition as the polymeric material used to laminate the barrier film and flexible substrate. At least one of these layers is pigmented. The resulting four (4) layered fabric chemical protective fabric has a burst strength of at least 75 psi and preferably has a basis weight no greater than 185 g/m$^2$, and more preferably, less than about 165 g/m$^2$. The four (4) layered protective fabric, when employing a barrier film that is uncoated, has a barrier rating of at least 50 when the barrier film is less than 0.5 mils thick and a barrier rating of at least 75 when the barrier film is greater than 0.5 but less than 1.3 mils thick. When the composite protective fabric is fabricated into a protective garment having sewn and taped seams, the garment seams have a strength of at least 45 lbs.

The invention also comprises a processes for making a composite film and a composite fabric which are both particularly useful in constructing chemical protective garments. The process for constructing the composite protective film comprises extrusion coating the barrier film on one or both sides with polymeric materials, preferably thermoplastic resins, to form a two- or three-layer composite. In a two-layer composite, the polymeric layer is pigmented. In the three-layer composite protective film, the polymeric layers may be formed from different materials and at least one is pigmented. The process for constructing the composite protective fabric comprises providing a flexible substrate and laminating a barrier film to the substrate using a polymeric material, preferably a thermoplastic resin, to form a three (3) layered composite material. The unlaminated face of the barrier film is coated with a polymeric material, preferably a thermoplastic resin, which will permit the formation of seams between adjacent panels of the protective fabric when the protective fabric is fabricated into a garment. At least one of polymeric layers is pigmented.

As used herein, a chemical protective garment may include any article of clothing that covers all or part of the body and provides a barrier between the wearer and chemicals. This may include gloves, overalls, boots, jackets, pants, hoods, aprons, or combinations of these components or a garment that totally encapsulates the wearer. Other materials may be incorporated in the garment to provide for viewing, sealable openings, fasteners and ventilation.

The flexible substrate incorporated in the composite, protective fabric may comprise a woven or nonwoven fabric, made from synthetic or man-made materials. Non-limiting examples of suitable nonwoven fabrics include spunbonded polyolefins (e.g., polyethylene and polypropylene) and spunlaced fabrics made from polyester, polyamide, or mixtures of polyester and woodpulp. "TYVEK" spunbonded olefin and "SONTARA" spunlaced fabrics, both commercially available from E. I. du Pont de Nemours and Company, Wilmington, Del., are particularly useful nonwoven fabrics. Other non-limiting examples of suitable nonwoven materials include spunbonded polypropylene fabrics such as are sold by Veratec, Inc., Toronto, Ontario, Canada or Polybond, Inc. of Waynesboro, Va. Woven fabrics made from a number of man-made and natural fibers can also be employed.

Woven and nonwoven fabrics may have natural properties of flame retardance, such as the aramids sold under the trademarks "KEVLAR" and "NOMEX" by E. I. du Pont de Nemours and Company, Wilmington, Del., or can be treated to provide flame retardance. Likewise, the flexible substrate may be treated to prevent formation and build-up of static electricity.

As used herein, the term "barrier film" is intended to be broadly construed to mean a layer of at least 95% (by weight) single-composition, but which preferably may have one or both surfaces modified by a thin coating of an inorganic oxide, such as a metal oxide (e.g., aluminum oxide or zirconium oxide), oxides of non-metallics (e.g., silicon dioxide). Such coatings are taught, for example, for use in food packaging in U.S. Pat. No. 3,442,686, the disclosure of which is incorporated herein by way of reference. Such coatings can have a thickness within the range of 0.02 to 2 microns. To promote adhesion of the coated surface to the adjacent topcoat or adhesive layer the use of a primer layer is preferred. Also, one or both surfaces may be treated with ozone or by corona treatment, e.g., for improving adhesion, as is common to the protective garment trade.

Preferably, if the barrier film is so coated with an inorganic oxide, the coating on the barrier film should be between about 0.08–0.2 microns thick. These surface treatments may be used to improve resistance to chemical permeation, reflect radiant energy, or promote adhesion within the laminate. However, it should be noted that barrier film coatings are not necessary to produce a suitable barrier rating, but are used to further enhance barrier performance in protective garment applications.

Preferably, the barrier film, most preferably polyethylene terephthalate of 0.4 to 1.3 mil thickness, has thereon an adherent, flexible continuous (unbroken) glassy coating of an inorganic oxide, preferably $SiO_2$, 20–2000 nanometers in thickness (preferably 800 nm), protected by a heat-sealable flexible thermoplastic organic material, such as Surlyn® E-101 made by DuPont.

The preferred method of preparation of this structure utilizes the deposition of the vaporized inorganic material on the organic base film in a vacuum enclosure, and subsequent application of the sealable coating by melt extrusion onto the coating.

Possible coating techniques employ electrical resistance heating (tungsten filament) and electron beam heating, particularly for less easily vaporizable inorganic materials. An example of such a coated film is the Mos-T film sold by Oike & Co. Ltd of Kyoto, Japan.

If the deposition process yields a discontinuous film or if the deposition is too thick and fissures develop in the glassy layer during post deposition handling, then the glassy layer contributes only slightly to the barrier properties. If a continuous layer is achieved, then the contribution to barrier properties is surprisingly high. A thin layer is more resistant to flex cracking when the protective seal layer is on the film, as known from U.S. Pat. No. 3,442,686.

A number of polymeric materials may be selected to laminate (i.e., adhere) the flexible substrate and the barrier film. The polymeric material must be suitable to adhere the flexible substrate to the barrier film. Thermoplastic resins, such as copolymers of polyethylene and acrylic or methacrylic acid or methyl acrylate, or terpolymers of methacrylic acid, isobutyl acrylate and polyethylene, which may or may not contain metal cations, may be employed. Likewise, the polymeric material, on the exposed surface or surfaces of the composite protective film or the exposed surface of the composite protective fabric may also comprise polyolefin homopolymers, copolymers or terpolymers. These polymeric materials are selected to promote the formation of seams between adjacent panels of the protective garment when the composite material is fabricated into a protective garment.

A highly concentrated mixture of the pigment and compatible polymeric resin is used to impart color to the polymeric layers of the chemical protective garment materials. This concentrate may contain a high percentage of pigment, e.g., 50%, blended into a polymeric resin which will not degrade the performance of the polymeric layer or the ease by which the material is made. This pigmented concentrate is mixed with the polymeric material in measured amounts prior to lamination or coating of the barrier film.

The polymeric materials used to adhere the flexible substrate to the barrier film as well as the external topcoat material may also contain fire retardant or antistatic additives to impart specific characteristics to the composite fabric. These polymeric materials may also contain pigments to impart color to the protective film or protective fabric. The nonwoven substrate in the protective fabric may be colored. In addition, the barrier film itself may be colored or printed with a solid color or identifying script or symbols to aid identification and distinction from other materials comprising the composite fabric.

DETAILED DESCRIPTION OF THE PREFERRED EMBODIMENTS

Figure 1:
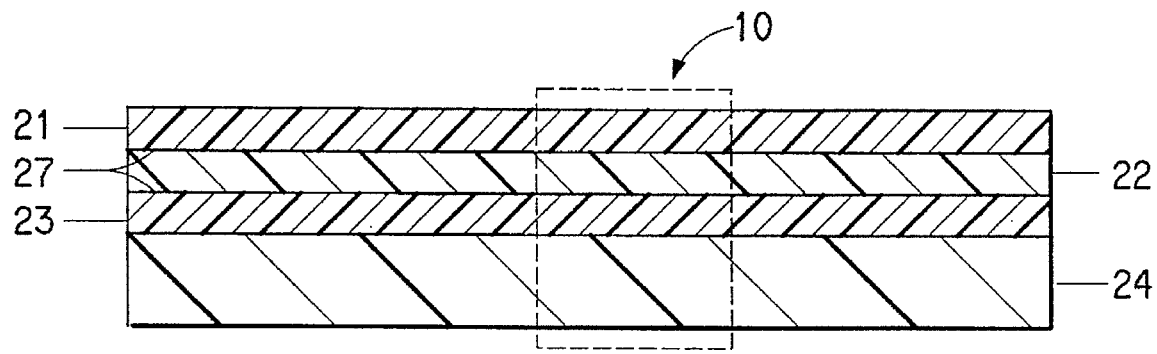
FIG. 1 is a cross-sectional diagram of an embodiment of the invention illustrating the various layers that make up the composite chemical protective fabric.

Referring now to the drawings wherein like reference numerals represent like elements, FIG. 1 illustrates a multi-layered structure of the composite chemical protective fabric 10 of the invention. The laminate includes a layer of thermoplastic resin 21, a barrier film 22, another layer of thermoplastic resin 23 and a flexible substrate 24. When the protective fabric 10 is assembled into a chemical protective garment, layer 21 will be away from the wearer and layer 24 will be towards the wearer. Barrier film 22 may be any one of a number of preformed films that resist permeation by a wide variety of chemicals.

Preferably, the barrier film consists of non-plasticized, oriented polyethylene terephthalate (PET), oriented nylon such as 6-nylon and 66-nylon, or oriented polyethylene napthalate. The polyester films are most preferably biaxially oriented. Biaxially oriented 6-nylon films also are effective. Films from about 0.4 to 3.0 mils can be used, preferably from about 0.45 to 1.0 mils. The degree of orientation and film thickness can be balanced to achieve the desired balance of chemical barrier properties and physical properties of the film. The barrier protection increases as orientation and thickness increase.

One or both surfaces 27 of the barrier film 22 may be modified. One or both surfaces may be treated by high voltage electrical corona, ozone, or with primers to promote adhesion. One or both surfaces 27 may be coated with a thin film of inorganic oxide such as silicon dioxide to improve the barrier resistance of the film to specific chemicals, to improve the radiant energy reflectance of the structure, or to provide color, writings or symbols.

However, as noted above, the key aspect of the invention is that the barrier film consists essentially of a single polymeric material, that in itself, uncoated and untreated, provides resistance to a wide variety of chemicals and contributes to the total physical properties of the composite chemical protective chemical barrier fabric 10.

The thermoplastic resin 21 may be a terpolymer, copolymer or homopolymer of polyethylene. When using PET film (e.g., "MYLAR" film commercially available from E. I. du Pont de Nemours and Company, Wilmington, Del.) for barrier film 22 to which the only treatment is corona, the terpolymer of polyethylene, methacrylic acid and isobutyl acrylate, this terpolymer having been slightly neutralized with zinc, has been found to be especially useful. Thus, uncoated, unprimed "MYLAR" film, with corona treated surfaces, may used in making the inventive fabric without the aid of additional adhesive layers or barrier film layers as was necessary in prior art.

A characteristic of thermoplastic resin 21 is that it may be sealed to itself or to other sealing surfaces by the use of heat or ultrasonic energy. Thermoplastic resin 21 may be between about 0.25 to 3 mils thick, preferably between about 0.5 to 1.5 mils thick. Thermoplastic resin 23 serves to adhere the barrier film layer 22 to the flexible substrate 24. Thermoplastic resins 23 and 21 may be made from the same or from different thermoplastic resins. Thermoplastic resin 23 may have a thickness of between about 0.25 to 3.0 mils, preferably between about 0.50 to 1.0 mils.

A colored pigment concentrate, such as "SPECTRATECH" HM35327, from Quantum Chemical Corporation, Cincinnati, Ohio, may be added to resins 21 and/or 23. The barrier film 22 may be printed or contain a pigment, in either a solid color, or in symbols or in writing. Preferably, a pigment is blended into the molten resin used to form thermoplastic resin layers 21 and 23.

Flexible substrate 24 provides physical and aesthetics characteristics to the composite protective fabric. Flexible substrate 24 is chosen to contribute to the tensile strength, burst strength or tear resistance of the composite structure. Flexible substrate 24 may also be chosen to contribute to flame retardance and to antistatic properties of the composite fabric. Preferably, a spunbonded polyolefin (e.g., polyethylene or polypropylene) or a spunlaced polyester fabric may be employed. Other fabrics that have high intrinsic strength, flame retardance or high temperature resistance may also be used for the substrate. Preferably, 1.2 ounces per square yard spunbonded polyethylene, or 2.0 ounces per square yard spunlaced polyester, or 2.0 to 2.5 ounces per square yard spunbonded polypropylene are used.

Figure 2:
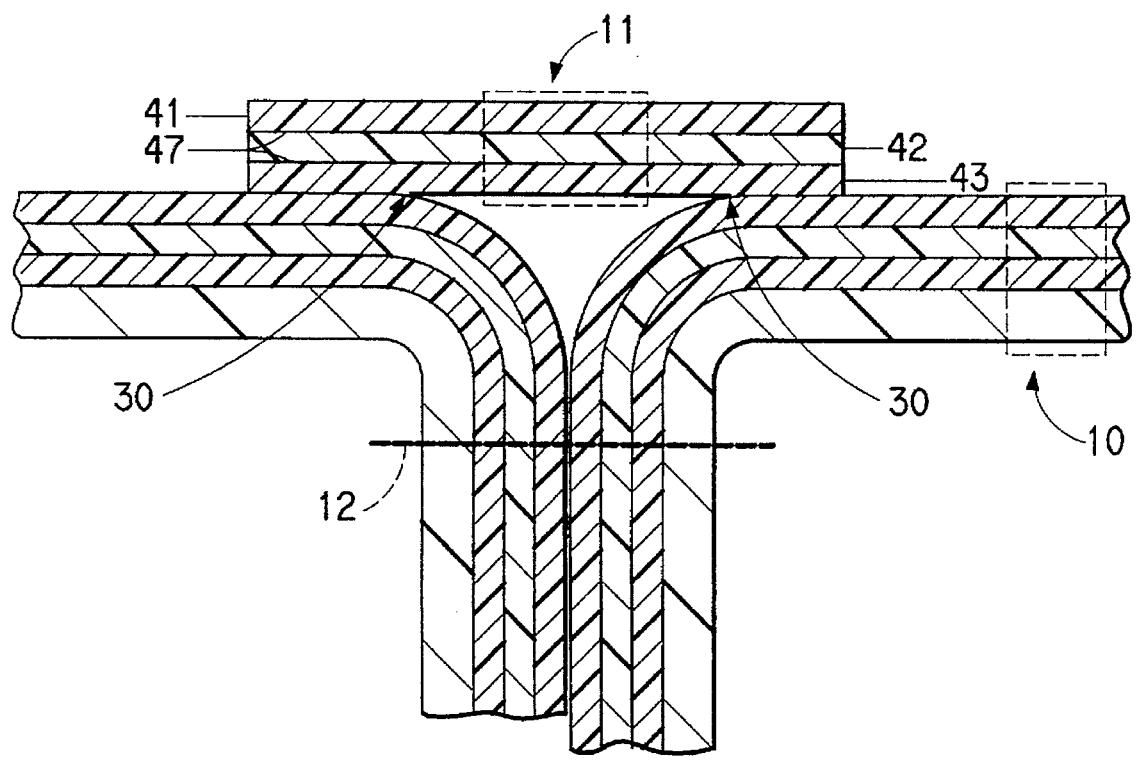
FIG. 2 is a cross-sectional diagram of a representative sewed and taped seam in a chemical protective garment made from the inventive chemical protective fabric.

Referring now to FIG. 2, a cross-section of a sewn and taped seam of a chemical protective garment is shown. Two panels of composite chemical barrier fabric 10 are joined by traditional fabric sewing techniques with sewing thread 12. The external surfaces of the fabric abut in this seam. A tape made for composite protective film 11 is then heated and applied such that the tape bridges the sewn seam and creates a liquid and vapor tight barrier. The barrier film 42 incorporated in composite protective film 11 may meet the same qualifications as the barrier film 22 in the composite protective fabric 10.

The composite protective film may consist of 3 layers as shown in FIG. 2, or may have a 2-layer structure in which layer 41 is not applied to the barrier film. Layers 41 and 43 applied to the barrier film may have the same qualifications as layers 21 and 23 of the protective fabric 10. The surfaces 47 of the barrier film 42 in protective film 11 may be treated in a similar manner as surfaces 27 of the barrier film 22 in the composite protective fabric 10. The important aspect of protective film 11 is that it provide a means to form strong seals. When protective film 11 is slit into tape, it is important that a strong, vapor and liquid tight seal 30 can be formed between the protective film 11 and the outer layer of the protective fabric 10. Likewise, when protective film 11 is used to make garments, such as gloves, it is important that the applied, outer layers form strong, vapor and liquid tight seals.

Figure 3:
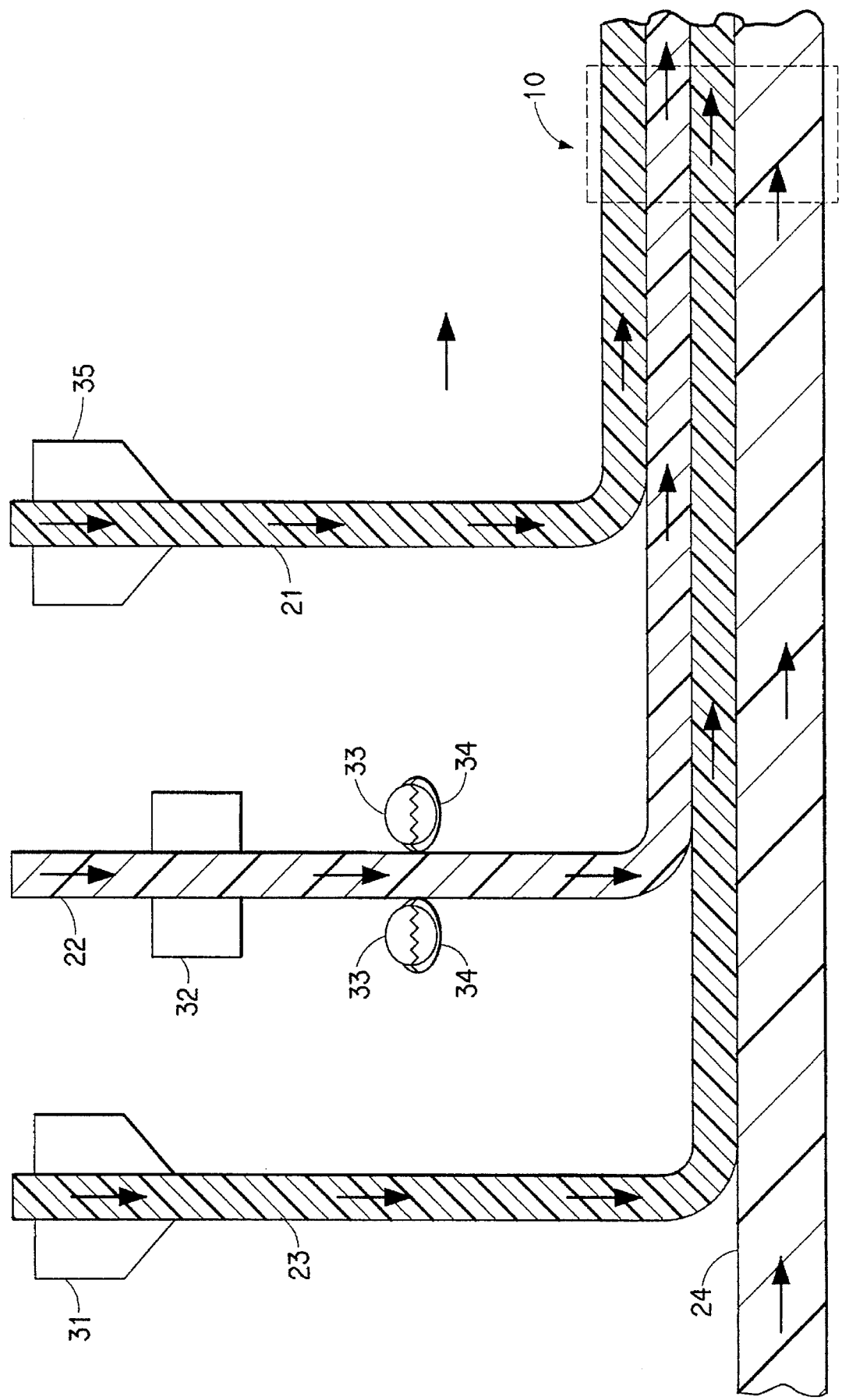
FIG. 3 is a schematic diagram of a process suitable for manufacturing the inventive chemical protective fabric.

As depicted in FIG. 3, the layers of the inventive protective fabric can be uniquely combined to produce a composite chemical barrier fabric 10 in a single pass process. For example, the flexible substrate 24 can be fed into the nip between two moving rolls (not shown). Barrier film 22 can be separately fed into the same nip. One or both surfaces of barrier film 22 may be treated with ozone or corona using devices 32 well known in the extrusion coating art. Well-known and commercially available primers may be applied and cured to one or both surfaces of the barrier film 22 using well known equipment (33 and 34) and techniques. Thermoplastic resin 23 is extruded from typical extrusion equipment 31 and impinges barrier film 22 and flexible substrate 24 just prior to passage through the nip. The surface of this 3-layered composite, which comprises the uncoated surface of the barrier film 22, can then be treated with ozone, corona or primer and then coated with thermoplastic resin 21 which is extruded from typical extrusion equipment 35 prior to passage of the entire four (4) layered composite through a second nip. Ideally, a one pass process into which the flexible substrate 24, barrier film 22, and resin for layers 21 and 23 are supplied, results in the inventive four (4) layered fabric 10. However, this process can be divided into several steps. One option is to coat the barrier film 22 with the thermoplastic resin 21 to create a two-layer version of composite protective film 11. This film can then be laminated to flexible substrate 24 with thermoplastic resin 23. Alternatively, the flexible substrate 24 and barrier film 22 may be laminated with thermoplastic resin 23 and then gathered on a roll. The three (3) layered composite is then unwound, the uncoated side of the barrier film 22 treated, and the outer thermoplastic resin topcoat 21 added during a second pass. Likewise, composite protective film 11 can be created by a similar process, wherein flexible substrate 24 is not employed. Whether done in one pass or two, or in which order, the key to this process is to provide a composite protective film or fabric having a good balance of properties and characteristics (e.g., strength, basis weight and barrier rating).

The American Society of Testing and Materials (ASTM) has developed and published test methods (e.g., ASTM F739) entitled "Test Method for Resistance of Protective Clothing Materials to Permeation by Liquids and Gases". A test device consisting of 2 chambers separated by the chemical protective garment material is specified in this method. The surface of the chemical protective garment material intended to be away from the wearer, is exposed to the chemical. Samples are periodically taken from the chamber which is exposed to the opposite surface of the chemical protective garment material. These samples are analyzed by any one of a number standard analytical chemical techniques to determine the concentration of challenge chemical present. The "breakthrough time" of the chemical with relation to the garment material is defined as the time at which the smallest detectable amount of the challenge chemical can be detected.

Since there are situations where more than one hazardous chemical may be present in harmful amounts, chemical protective garment materials should provide protection against a number of hazardous chemicals. ASTM standard F1001, "Standard Guide for Selection of Chemicals to Evaluate Protective Clothing Materials", provides a list of 21 chemicals by which to test and compare chemical protective garment materials.

For this invention, the resistance of chemical protective garment materials is measured over a period of eight hours separately for each of the 21 chemicals. The average breakthrough time, in minutes, is reported for those chemicals that permeate through the material and are detected before 8 hours. If no permeation of the chemical through the material is detected in 8 hours, the breakthrough time is reported to exceed 480 minutes. The metric by which to compare chemical protective garment materials is calculated by dividing the average breakthrough time against all 21 chemicals by 480 and multiplying by 100. If no breakthrough is calculated in after 8 hours, a value of 480 minutes is used for that chemical in calculating the average. A chemical protective garment material through which none of the 21 chemicals permeates in 8 hours would have a rating of 100. A chemical protective garment material through which all chemicals permeate in less than 4 hours would have a rating less than 50. If all chemicals permeate the material immediately, the rating would be 0.

A barrier rating can be calculated for any combination and number of chemicals, but preferably, when used for comparison purposes, the rating should be based on test results from the same set of chemicals.

In addition, the physical force required to rupture the garment material can be used to judge the strength of the garment. The strength of the material can be measured by force required to rupture a 1 inch by 8 inch strip of the material or the pressure required to burst the material, such as measured by the "Mullen Burst" test.

The tensile strength of the seam is measured by the force to rupture a 2 inch by 8 inch sample in which the seam is perpendicular to the long axis of the sample. The sealing strength capability of the protective film can be measured using the heat seal peel strength test.

The tear propagation resistance of the film can be measured by the Elmendorf Tear Strength Test. The impact resistance of the film can be measured by the Spencer Impact Test.

The following commercially available products can be used in the invention. Several of these products are used to illustrate the invention in the Examples and the Table provided hereinafter. "SURLYN" PK101 is an ionically crosslinked terpolymer of methacrylic acid, isobutyl acrylate and polyethylene produced and sold by E. I. du Pont de Nemours and Company, Wilmington, Del. "SURLYN" 1652SR is an ionically crosslinked copolymer of ethylene and methacrylic acid which contains slip and release agents sold by E. I. du Pont de Nemours and Company, Wilmington, Del. "MYLAR" is a biaxially oriented polyethylene terephthalate (PET) film produced and sold by E. I. du Pont de Nemours and Company, Wilmington, Del. "DARTEK" Type T420 is an oriented 66-nylon film sold by Du Pont Canada, Inc. of Mississauga, Ontario, Canada. "SONTARA" Style 8005 is a 2.0 ounce per square yard, nonwoven, 100% polyethylene terephthalate spunlaced fabric produced and sold by E. I. du Pont de Nemours and Company, Wilmington, Del. "TYVEK" Style 1422A is a 1.2 ounce per square yard, spunbonded polyolefin fabric produced and sold by E. I. du Pont de Nemours and Company, Wilmington, Del. "BYNEL" E2002 is a unneutralized, terpolymer of methacrylic acid, isobutyl acrylate and polyethylene produced and sold by E. I. du Pont de Nemours and Company, Wilmington, Del. "MICA" A-131-X is a water based, modified polyethyleneimine primer produced and sold by Mica Corporation, Stratford, Conn.

EXAMPLES

The following non-limiting examples are intended to illustrate the invention and not to limit the invention in any manner. In these examples, the following test methods were used in measuring various physical properties.

Before testing, all samples were conditioned for 8 hours and tested at 73° F. and 50% relative humidity. Burst Strength was measured on an A. B. Lorentzen & Wettre Autoline Bursting Strength Tester, Model 80-319. Tensile Strength of items I though X and XIII was measured on 1 inch by 8 inch strips, independently in the machine direction and cross directions of the fabric substrate on a tensile testing device with a crosshead speed of 2 inches per minute. Tensile strength was measured in a manner similar to the procedure described in ASTM D751. Seam Strength of items I through X and XIII was measured by sewing and taping fabric samples, cutting samples into 2 inch by 8 inch strips in which the seam is perpendicular and at the center of the long axis of the sample, and measuring the force required to rupture the seam or fabric with a tensile testing device with a crosshead moving at 2 inches per minute. Seam strength was measured in a manner similar to the procedure described in ASTM D751.

Sealing strength of the composite protective film is measured by the heat seal peel strength test. In that test a 4 inch by 6 inch sample of the composite protective film is folded to create a 4 inch by 3 inch folded specimen with the heat sealable surfaces facing. The open end opposite the fold is placed between the sealing surfaces of a Sentinel type precision bar heat sealer, fitted with an one-eight (⅛) inch, single channel bar which has equilibrated to 250° F. The other sealing surface is a silicone rubber pad. The sealing bar is brought in contact with the film and held at 40 psi for one-half (½) second. The now sealed sample is conditioned for 24 hours at 73° F. and 50%, slit along the fold and then cut into 1 inch wide specimens, bisected by the sealed seam. The film on either side of the seam are clamped into a tensile testing machine with jaws separated by 2 inches. A steady strain of 20 inches per minute is applied to the seam and force required to rupture the seam recorded. Elmendorf Tear Resistance of the composite protective film was measured following ASTM D1922. Spencer Impact resistance was measured according to ASTM Method D3420. Tensile strength was measured in both the machine and cross direction, on 1 by 6 inch strips, at 2 inches per minute, starting with a clamp separation of 2 inches. The barrier rating was determined according to ASTM F739 and ASTM F1001 as described above.

Typical properties of commercially available materials useful in this invention include:

DuPont Mylar® which is biaxially oriented polyethylene terephthalate film, uncoated, and transparent having the following properties—

| Product | 48 LB or 48 LBT | 92 LB or 92 LBT |
|---|---|---|
| Thickness | 0.48 mil | 0.92 mil |
| Density | 1.38 g/cc | 1.38 g/cc |
| Modulus | 550 kpsi (MD & CD) | 550 kpsi (MD & CD) |

DuPont Dartek® which is uniaxially oriented nylon 6,6 film available from DuPont of Canada—

| Product | T420 |
|---|---|
| Thickness | 1.0 mil |
| Density | 1.14 g/cc |
| Modulus | 425 kpsi (MD)/375 kpsi (CD) |

Biaxially oriented, polyethylene naphthalate film available from ICI as Kaladex® 2000—

| Product | Kaladex® 2000 |
|---|---|
| Thickness | 1.0 mil |
| Unit Weight | 20.9 |
| Density | 1.36 |
| Modulus | 870 kpsi (MD & CD) |

Surlyn® 1625SR from DuPont which is ionically crosslinked, melt-extrudable, ethylene/methacrylic acid based copolymer adhesive, for good adhesion to polyester and nylon films, melt index of 5.2, contains slip and release agent (oleyl palmitamide and behenamide).

Surlyn® PK101 or E101 from DuPont which is melt-extrudable, ionically crosslinked ethylene/methacrylic acid/ isobutyl acrylate terpolymer, which exhibits good melt adhesion to unprimed, but corona treated PET films.

"Polybond" point-bonded spunbonded polypropylene which is spun bonded polypropylene nonwoven fabric made with the following weight to property relationships:

| Basis Weight oz/sqyd | Thickness mils | Grab Tensiles (lb MD/lb CD) | Air Permeability (cu ft/sg ft/min) |
|---|---|---|---|
| 2.0 | 15.1 | 48/37 | 335 |
| 2.5 | 16 | 60/46 | 285 |
| 3.0 | 18.8 | 64/50 | 258 |

Veratec spunbonded polypropylene which is spunbonded polypropylene nonwoven fabric made with the following weight to property relationships:

| Basis Weight oz/sqyd | Thickness mils | Grab Tensiles (lb MD/lb CD) |
|---|---|---|
| 2.0 | 18.2 | 45/36 |
| 3.0 | — | 56/44 |

EXAMPLE 1

In this example, "SURLYN" PK101 resin was extruded on experimental equipment from a 36 inch wide die at a melt temperature of 585 F. into a nip. A sheet of Type 92LB "MYLAR" film (barrier film) that was corona treated at 5.7 watts per square foot and a nonwoven sheet of "TYVEK" Style 1422A (flexible substrate) were passed through this nip at 200 feet per minute. The speed of the extruder screw feeding the die was adjusted to give a final thickness of 0.5 mil of "SURLYN" PK101 in the laminate structure being formed. The centerline of the nip relative to the centerline of the melt curtain of "SURLYN" PK101 and the position of the film and nonwoven was such that the molten polymer impinges the "MYLAR" film from 0 to 3 inches before the film meets the nonwoven at the nip and on the side of the film which will result in the molten polymer being between the film and nonwoven. The resulting three (3) layered composite structure was then gathered on a roll.

Subsequently, this three (3) layered structure is unwound at 200 feet per minute and passed through a corona treatment unit where 5.7 watts per square foot of energy is applied to the uncoated side of the barrier film. The film then passed into a nip where a 36 inch wide curtain of molten "SURLYN" PK101 resin was impinged upon the three (3) layered composite on the side where the uncoated barrier film is exposed, and in a position 0 to 3 inches before the nip. The resulting four (4) layered composite fabric was then gathered in a roll.

The laminate described in this example, and structures of other components assembled in the same fashion were tested for chemical and physical characteristics. Representative garment seams were sewn and taped from samples of these chemical protective garment materials. The properties of several chemical protective garment materials which employ "TYVEK" spunbonded olefin as a flexible substrate were also measured as well as the characteristics of commercially available chemical protective garment materials. These characteristics are listed in Table 1 below.

TABLE 1

| PRODUCT | BARRIER RATING | MULLEN BURST (psi) | TENSILE STRENGTH (lbs/lbs) | FABRIC WEIGHT (g/m2) | SEAM STRENGTH (lbs/2 in) |
|---|---|---|---|---|---|
| I | 14 | 4 | 13/13 | 70 | 27 |
| II | 27 | 69 | 17/13 | 120 | 28 |
| III | 73 | 131 | 39/20 | 106 | 46 |
| IV | 77 | 131 | 35/27 | 111 | 53 |
| V | 53 | 204 | 37/25 | 167 | 26 |
| VI | 53 | 123 | 41/16 | 127 | 63 |
| VII | 53 | 82 | 29/20 | 168 | 55 |
| VIII | 77 | 166 | 49/26 | 142 | 70 |
| IX | 77 | 124 | 35/29 | 181 | 59 |
| X | 90 | 173 | 26/27 | 197 | 46 |

Description of Products in Table 1

I. Laminate of 0.85 ounce per square yard, low density polyethylene and 1.2 ounce per square yard "TYVEK", sold as "TYVEK QC", by E. I. dupont De Nemours and Company, Wilmington, Del. (hereinafter "DuPont").

II. Laminate of Style 1422A "TYVEK" available from DuPont and "SARANEX" 23-P barrier film commercially available from Dow Chemical, Midland, Mich.

III. An embodiment of this invention using "SURLYN" PK101 resin for the seal and tie layers (i.e., laminating and topcoat layers), 1.0 mil "DARTEK" nylon film as the barrier film and Style 1422A "TYVEK" as the flexible substrate.

IV. The embodiment of invention as prepared and described in Example 1.

V. A proprietary laminate made and sold by Chemron, Inc. of Vernon Hills, Ill. under the trademark "CHEMREL".

VI. An embodiment of this invention using Type 48 LB "MYLAR" film as the barrier film and 2.0 ounce per square yard, 100% spunlaced polyester fabric designated Style 8005 "SONTARA". "SURLYN" PK101 resin was used for the tie and seal layers.

VII. An embodiment of this invention using Type 48 LB "MYLAR" film as the barrier film and 3.0 ounce per square yard "VERASPUN" Style 90030 spunbonded polypropylene fabric sold by Veratec, Inc. of Toronto, Ontario, Canada "SURLYN" PK101 resin was used for the tie and seal layers.

VIII. An embodiment of this invention using Type 92 LB "MYLAR" film as the barrier layer and as the substrate Style 8005 "SONTARA". "SURLYN" PK101 resin was used for the tie and seal layers.

IX. An embodiment of this invention using Type 92 LB "MYLAR" film as the barrier layer and 3.0 ounce per square yard Veraspun 90030 spunbonded polypropylene fabric sold by Veratec, Inc. "SURLYN" PK101 resin was used for the tie and seal layers.

X. A multi-layered laminate produced and sold by E. I. du Pont de Nemours and Company under the trademark "BARRICADE".

EXAMPLE 2

In this example, the same process steps are followed as in Example 1, except that a chemical protective garment fabric is fabricated with a barrier film consisting of a 0.48 mil thick polyethylene terephthalate (PET) film ("MYLAR") with a vapor-deposited 80 nanometer glassy continuous coating of an oxide of silicon on one side thereof.

The resulting chemical protective garment fabric has a barrier rating of greater than 95 when tested against the 21 chemicals in ASTM F1001, before and after 100 flexes on a Gelbo Tester (ASTM F392). The fabric is found to be suitable for making into chemical protective garments. The grafting of silicon dioxide by vapor deposition to the barrier film enhances the barrier rating of the resulting fabric which allows the barrier rating to be tailored depending on the chemicals to be encountered.

EXAMPLE 3

In this example, item XI is created by coating 48LBT "MYLAR" with molten "SURLYN" 1652SR after surface treatment by corona and primer to give a composite protective film with total thickness of 1.33 mil. Color is imparted to item XI by blending 10 parts of "SURLYN" 1652SR with one part of "SPECTRATECH" HM35327 pigment concentrate, by weight. Likewise, item XII is created by coating 92LBT "MYLAR" with "SURLYN" 1652SR to produce a structure with total thickness of 1.53 mil. Color is imparted to item XII by blending 10 parts of "SURLYN" 1652SR with one part of "SPECTRATECH" HM35327 pigment concentrate, by weight. The properties of the resulting protective films are given in Table 2.

TABLE 2

| Item | Heat Seal Peel Strength @250° F. (g/inch) | Tensile Strength (psi) | Mullen Burst Strength (psi) | Elemendorf Tear Strength (grams) | Spencer Impact Resistance (lbs./mil) |
|---|---|---|---|---|---|
| XI | 2408 | 12/11 | 44.6 | 7.5/7.5 | 10.5 |
| XII | 1582 | 20/23 | 86.0 | 10.4/12.6 | 21.1 |
| Item | Basis wt. (g/sq m) | | | Barrier Rating | |
| XI | 37 | | | 73 | |
| XII | 47 | | | 90 | |

These examples show that thin, strong, heat-sealable films suitable by themselves for use in garments can be fabricated as a single barrier layer of polyethylene terephthalate without a fabric substrate.

EXAMPLE 4

Pigmented low density polyethylene (LDPE) is extruded from a extrusion coating die at a melt temperature of 600° F. onto a continuous moving sheet of barrier film. The LDPE has a melt index of 7.0 and is blended with 10%, by weight, Quantum "SPECTRATECH" color HM35327. The rate of extrusion is adjusted to yield a coating of 11.6 g of pigmented LDPE per square yard of barrier film as the film moves at 500 feet per minute. The side of the barrier film which is coated with the pigmented LDPE is corona treated and coated with an aqueous solution of adhesive primer which is dried by hot air, just prior to the addition of the pigmented LDPE. The opposite surface of the barrier film is subsequently corona treated and primed in a similar manner. The coated barrier film then enters a nip, where the treated, uncoated surface is brought into contact with a molten layer of pigmented ethylene methyl acrylate (EMA) copolymer resin. That EMA resin has a melt index of 6.0, an acid content of 20%, and is also extruded at 600° F. This EMA resin also contains 10%, by weight, of the same color concentrate and is applied to give a final coating of 16.4 grams per square yard of film with the film moving at 500 feet per minute. Into this nip is also introduced a corona treated fabric in such a way that the pigmented EMA resin is interposed between the fabric and film and the EMA resin serves to adhere the film and fabric. Table 2 shows the physical properties of the chemical protective fabrics provided by this process. In addition, this combination of ingredients provides a product which is not stiff or noisy when fashioned into a chemical protective garment.

TABLE 3

| PRODUCT | BARRIER RATING | MULLEN BURST (psi) | TENSILE STRENGTH (lbs/lbs) | FABRIC WEIGHT (g/m2) | SEAM STRENGTH (lbs/2 in) |
| --- | --- | --- | --- | --- | --- |
| XIII | 75 | 80.1 | 20/16 | 119 | 49 |

Description of Product in Table 3

XIII. Laminate of example 4, using 48 LB "MYLAR" film for the barrier film and 2.0 oz/yd2 point-bonded spunbonded polypropylene nonwoven fabric, from Polybond, as the substrate. The seams are sealed with tape slit from chemical protective film made in the same way as the fabric, but without the added nonwoven substrate.

EXAMPLE 5

On commercial extrusion coating and lamination equipment, a 60 inch curtain of molten ethylene methyl acrylate copolymer is extruded between moving webs of spunbonded polypropylene fabric and treated film. The film, fabric and extrudate come in contact at the nip between 2 rolls, one roll of which is chilled. The resulting 3 layer composite continues in contact with the chilled roll to reduce the temperature of the composite and solidify the molten resin. The extruded resin has a melt index of 6.0, an acid content of 20%. It is extruded at a melt temperature of 600° F. and contains 10%, by weight, Quantum "Spectratech" HM35327 color concentrate. The rate of extrusion is adjusted to give 16.4 grams per square yard extrudate within the structure, with the webs traveling at 500 feet per minute. The surface of the film in contact with the extrudate has been corona treated, coated with an aqueous solution of adhesive primer and dried by hot air before being brought in contact with the extrudate.

The opposite surface of the barrier film is subsequently treated by corona and adhesive primer. A molten curtain of low density polyethylene is applied to the uncoated surface of the barrier film, at a nip between a chilled and nonchilled roll. The low density polyethylene has a melt index of 7.0. It contains 10% by weight, color concentrate. It is extruded at 600° F. The rate of extrusion is adjusted to give a final weight of 11.6 grams per square yard on the uncoated surface of the film, with the film moving at 500 feet per minute.

Grab Tensile Strength and Mullen Burst Strength of Samples XIV, XV and XVI are measured according to the test method ASTM D751.

TABLE 4

| Product | Barrier Rating | Mullen Burst (psi) | Grab Tensile Strength (lbs MD/lbs XD) | Fabric Weight (g/m2) |
| --- | --- | --- | --- | --- |
| XIV | 90 | 170 | 99/89 | 149 |
| XV | 93 | 173 | 99/95 | 181 |
| XVI | 93 | 115 | 107/71 | 207 |

Explanation of Samples in Table 4:

XIV—Embodiment of this example using 2.5 oz per square yard Polybond spunbonded polypropylene and 92 LB DuPont Mylar® film.

XV—The example described in U.S. Pat. No. 4,855,178 (Langley).

XVI—The example described in U.S. Pat. No. 4,855,178 (Langley) except for substitution of 3.0 oz per square yard spunbonded polypropylene in lieu of 2.3 oz per square yard Phillips Duon fabric.

This examples demonstrates that, surprisingly, a single barrier layer of 100% polyester (sample XIV) gives equivalent barrier performance to the multi-barrier layer product described by Langley (sample XV) and with an average total thickness of barrier and surfaces layers no more than one half that described by Langley.

Comparison of Samples XIV and XVI illustrates the surprising finding that one can assemble a composite fabric with essentially equivalent physical characteristics by replacing a multi-layer, multi-barrier layer film with a single barrier film of homogeneous composition.

By their nature, uniaxially oriented and biaxially oriented nylon and polyester films tend to tear easily and can result in stiff, noisy composite structures. When adhered to fabric substrates, there can be a significant reduction in the tear propagation resistance of the composition.

In the preferred invention, to ensure adequate tear propagation resistance in a composite material, which also has adequate bond strength between the film and nonwoven, substrates are used that promote the distribution of the tear strength across a large area of the composite. This can be achieved by using a point-bonded, spunbonded polypropylene fabric which has surfaces that have been subjected to different levels of bonding among the fibers. One can measure the level of surface bonding by using a crock test. In this test, a rubber eraser is rubbed back and forth over the surface of the material. The rubber eraser is pressed against the fabric with a uniform pressure during this test. The level of surface bonding is proportional to the number of strokes required before fibers begin to be lifted from the surface of the fabric.

For example, when using a 2 oz/sq yd, point bonded, spunbonded polypropylene, which has relative surface crock measurements of 5 on one surface and 25 on the opposite surface, there is a significant difference in tear propagation resistance between items made using each side, as measured by the trapezoidal tear resistance test described in ASTM D1117.

Composite fabrics are made substantially according to method described in Example 1. When the film is adhered to the side of the fabric with the crock of 5, the trapezoidal tear strength of the composite fabrics is 7.2 lbs MD and 6.3 lbs CD, where MD and CD refer to machine direction and cross direction respectively. When the film is adhered to the side of the fabric with a crock of 25, i.e., the side of fabric in which the fibers were more bound together, the trapezoidal tear strength is 10.4 lbs MD and 9.8 lbs CD. Apparently, when the film is adhered to the more bonded side of the fabric, the fibers on the opposite surface, which are less bound together, can move and distribute the tearing force over a larger area of the fabric.

The selection of the resin to serve as the top coat on the barrier film can have a marked effect on the stiffness and amount of noise generated by the composite fabric, whether it contains a flexible substrate or not. For polyethylene terephthalate films, preferred resins include ionically crosslinked, melt-extrudable, ethylene/methacrylic acid based copolymers or melt-extrudable, ethylene/methacrylic acid/isobutyl acrylate terpolymers. It is important that one use particular resins to achieve the proper balance of noise and stiffness in garments made from the composite fabric. Low density polyethylene is a preferred topcoat and ethyl methyl acrylate copolymer is a preferred adhesive resin for the bond between the film and fabric substrate. The film should be primer treated conventionally in order to achieve desired inter layer adhesion within the composite material. By this invention a significant reduction in the stiffness and amount of noise created by a garment made with these resins, combined with high chemical barrier performance, can be achieved.

Although particular embodiments of the present invention have been described in the foregoing description, it will be understood by those skilled in the art that the invention is capable of numerous modifications, substitutions and rearrangements without departing from the spirit or essential attributes of the invention. Reference should be made to the appended claims, rather than to the foregoing specification, as indicating the scope of the invention.

We claim:

1. A chemical protective garment comprising a plurality of interconnected protective material pieces, each of said protective material pieces consisting essentially of: (a) a point bonded non-woven, flexible, reinforcing, fabric substrate: (b) a barrier film selected from the group consisting of oriented nylon, polyethylene terephthalate, and polyethylene naphthalate films laminated to the fabric substrate by a thermoplastic polymeric adhesive layer; and (c) a thermoplastic polymeric adhesive topcoat adhered to the unlaminated side of the barrier film, the protective material pieces of the garment having a burst strength of at least 75 psi, a chemical barrier rating of at least 50 when the barrier film is less than 0.5 mils thick, and a chemical barrier rating of at least 75 when the barrier film is greater than 0.5, but less than 1.3 mils thick.

2. The chemical protective garment of claim 1 wherein the protective material pieces of the garment are interconnected by stitched seams and said seams are sealed with a thermoplastic polymer adhesive.

3. The chemical protective garment of claim 2 wherein the stitched seams are covered on the side of the garment facing away from a wearer of the garment with sealed strips of a barrier film bonded to opposite sides of the seam by a thermoplastic polymer adhesive, the barrier film selected from the group consisting of oriented nylon, polyethylene terephthalate, and polyethylene naphthalate films.

4. The chemical protective garment of claim 3 wherein the seams of the garment have a seam peel strength of at least 1500 g/inch.

5. The chemical protective garment of claim 2 wherein the barrier film in the protective material pieces of the garment is covered on at least one side with a vapor-deposited coating of an inorganic oxide selected from the group consisting of oxides of silicon, aluminum, and zirconium.

6. The chemical protective garment of claim 5 wherein the chemical barrier rating of the protective material is at least 90 and the barrier film is less than 0.5 mils thick.

7. The chemical protective garment of claim 3 wherein the fabric substrate of the protective material pieces of the garment comprises a non-woven fabric of polyethylene, wherein the barrier film in the protective material pieces of the garment fabric and in the strips sealing the seams of the garment is biaxially oriented polyethylene terephthalate, and wherein the thermoplastic polymer adhesive consists essentially of low-density polyethylene.

8. The chemical protective garment of claim 2 wherein the protective material pieces of the garment have a basis weight no greater than 185 g/m$^2$.

9. The chemical protective garment of claim 2 wherein the garment is a glove.

10. The chemical protective garment of claim 3 wherein the seams of the garment are substantially impermeable to liquid and vapor.

* * * * *